United States Patent
Weigl et al.

(10) Patent No.: US 9,937,586 B2
(45) Date of Patent: Apr. 10, 2018

(54) METHOD AND DEVICE FOR FRICTION STIR WELDING MATERIALS OF DIFFERENT THICKNESSES AND HAVING FILLET WELDS

(71) Applicant: GRENZEBACH MASCHINENBAU GMBH, Asbach-Baeumenheim (DE)

(72) Inventors: Markus Weigl, Donauwörth (DE); Alexander Feineis, Donauwörth (DE); Sascha Christoph, Donauwörth (DE); Matthias Kunz, Tapfheim (DE)

(73) Assignee: GRENZEBACH MASCHINENBAU GMBH, Asbach-Baeumenheim (DE)

( * ) Notice: Subject to any disclaimer, the term of this patent is extended or adjusted under 35 U.S.C. 154(b) by 0 days.

(21) Appl. No.: 15/106,969

(22) PCT Filed: Jan. 27, 2015

(86) PCT No.: PCT/DE2015/000022
§ 371 (c)(1),
(2) Date: Jun. 21, 2016

(87) PCT Pub. No.: WO2015/113542
PCT Pub. Date: Aug. 6, 2015

(65) Prior Publication Data
US 2016/0346869 A1 Dec. 1, 2016

(30) Foreign Application Priority Data
Jan. 28, 2014 (DE) .......................... 10 2014 001 050

(51) Int. Cl.
*B23K 20/12* (2006.01)

(52) U.S. Cl.
CPC ...... *B23K 20/1245* (2013.01); *B23K 20/1265* (2013.01)

(58) Field of Classification Search
CPC ....................................... B23K 20/122–20/128
(Continued)

(56) References Cited

U.S. PATENT DOCUMENTS 5,697,544 A * 12/1997 Wykes ................. B23K 20/125
156/580
5,713,507 A * 2/1998 Holt ..................... B23K 20/125
228/112.1

(Continued)

FOREIGN PATENT DOCUMENTS

DE 102004030381 1/2006
DE 202014000747 3/2014
(Continued)

*Primary Examiner* — Kiley Stoner
(74) *Attorney, Agent, or Firm* — Duane Morris LLP; Gregory M. Lefkowitz; Jason M. Nolan (57) ABSTRACT

The invention relates to a device and a method for friction stir welding materials of different thicknesses and that have fillet welds, comprising the following features: a) a receiver panel (1) that has a drive head (2) and a welding shoe (4) that has a pin bearing, said welding shoe (4) being selected and inserted according to whether it is being used with materials of different thicknesses or with materials that have fillet welds, b) the longitudinal axis of the spindle bearing being at an incline of an angle between 0 and 5 degrees relative to the vertical line; the transverse incline being 0 degrees for the fillet weld shoe (4), and c) when the welding pin (6) is exchanged, the length of the welding pin (6) being adjusted using an adjustment element (12) and the position of the counter-bearing of the welding pin (6) being adjusted using an adjustable pin stop (19) and, in the case of the pin stop (19), additionally secured by an adjustment screw (20).

16 Claims, 7 Drawing Sheets

(58) Field of Classification Search
USPC .............................................. 228/112.1, 2.1
See application file for complete search history.

(56) References Cited

U.S. PATENT DOCUMENTS

| | | | |
|---|---|---|---|
| 6,199,745 B1 | 3/2001 | Campbell et al. | |
| 6,247,633 B1 | 6/2001 | White et al. | |
| 6,264,088 B1* | 7/2001 | Larsson | B23K 20/125 228/112.1 |
| 6,299,050 B1* | 10/2001 | Okamura | B23K 20/123 156/73.5 |
| 6,302,315 B1* | 10/2001 | Thompson | B23K 20/123 228/112.1 |
| 8,857,696 B1* | 10/2014 | Merah | B23K 20/1265 228/112.1 |
| 9,010,613 B1* | 4/2015 | Matlack | B23K 20/1225 228/112.1 |
| 2003/0057261 A1* | 3/2003 | Holman | B23K 20/125 228/112.1 |
| 2003/0209588 A1* | 11/2003 | Colligan | B23K 20/1255 228/112.1 |
| 2004/0074949 A1* | 4/2004 | Narita | B21D 51/26 228/112.1 |
| 2004/0108359 A1* | 6/2004 | Hashimoto | B23K 20/1255 228/21 |
| 2004/0134971 A1* | 7/2004 | Narita | B23K 20/122 228/112.1 |
| 2006/0102699 A1* | 5/2006 | Burton | B23K 20/123 228/112.1 |
| 2006/0169740 A1* | 8/2006 | Fukuhara | B23K 20/125 228/2.1 |
| 2007/0057015 A1* | 3/2007 | Colligan | B23K 20/1255 228/2.1 |
| 2009/0123778 A1* | 5/2009 | Russell | B23K 20/1235 428/661 |
| 2009/0152328 A1 | 6/2009 | Oakmoto et al. | |
| 2009/0294511 A1* | 12/2009 | Fleming | B23K 20/125 228/103 |
| 2010/0006622 A1* | 1/2010 | Smith | B23K 20/125 228/2.1 |
| 2012/0022683 A1* | 1/2012 | Fleming | B23K 20/125 700/212 |
| 2012/0193401 A1* | 8/2012 | Hori | B23K 20/1265 228/112.1 |
| 2013/0075452 A1* | 3/2013 | Burford | B23K 20/1255 228/2.1 |
| 2013/0206817 A1 | 8/2013 | Tavares et al. | |
| 2014/0061185 A1* | 3/2014 | Schindele | B23K 20/128 219/617 |
| 2014/0299651 A1* | 10/2014 | Stotler | B23K 20/1255 228/2.1 |
| 2014/0360650 A1* | 12/2014 | Silvanus | B23K 20/1255 156/73.5 |
| 2015/0102087 A1 | 4/2015 | Foerg et al. | |
| 2016/0008918 A1* | 1/2016 | Burford | B23K 20/1255 228/112.1 |
| 2016/0354860 A1* | 12/2016 | Boettcher | B23K 20/1255 |

FOREIGN PATENT DOCUMENTS

| | | | |
|---|---|---|---|
| DE | 102014115535 B3 * | 10/2014 | |
| JP | H11320128 | 11/1999 | |
| JP | 2011079031 A * | 4/2011 | ......... B23K 20/1265 |
| JP | 2011206786 | 10/2011 | |
| WO | 2007006669 | 1/2007 | |

* cited by examiner

METHOD AND DEVICE FOR FRICTION STIR WELDING MATERIALS OF DIFFERENT THICKNESSES AND HAVING FILLET WELDS

CROSS-REFERENCE TO RELATED APPLICATIONS

This application is a § 371 national stage entry of International Application No. PCT/DE2015/000022, filed Jan. 27, 2015, which claims priority to German Patent Application No. 10 2014 001 050.3 filed Jan. 28, 2014, the entire contents of which are incorporated herein by reference.

The invention relates to a method and a device for friction stir welding materials of different thicknesses and having fillet welds.

At the beginning of the nineties of the last century, friction stir welding was developed. In the meantime, friction stir welding is being successfully used among other things for the welding of aluminum alloys in many relevant areas of industry. The applications range here from one-off pieces and small batches through to larger batches. Apart from the outstanding quality of the weld seam, other factors contributing to the commercial success are the high degree of reproducibility and the little preparational work and expenditure on finishing. This method can be automated very well and allows quality monitoring on the basis of machine monitoring. In friction stir welding, frictional heat is generated in the joining region of the materials to be connected by means of the friction between a rotating tool which at the same time is moved translationally and to which pressure is applied. The tool is moved along the joining region and stirs the plastified material in the interior of the seam of the materials to be connected that are butting against one another. The applied pressure presses the plastified material together. At the end of this seam, the tool is withdrawn from the region of the connection and the weld seam can be subjected to loading immediately.

DE 10 2004 030 381 B3 discloses a method for online quality testing in friction stir welding that is based on the aim of being reliable and simple.

To achieve this object, it is claimed that a friction stirring tool is introduced under rotational movement and applied pressure into the material of workpieces to be welded and is guided along a joint of the workpieces to be welded, the application of pressure and/or the oscillations of the friction stirring tool that occur during the friction stir welding process, of the workpieces to be welded or of other elements that are excited by the welding process being measured over time and subsequently converted by means of a Fourier transform into frequency-amplitude spectra, and that the frequency-amplitude spectra determined are compared with reference values for testing the quality of the welded connection produced.

Furthermore, WO 2007/006669 A1 discloses a friction stir welding tool and also a method and an assembly for the real-time control of a friction stir welding process by recording the forces of acceleration and/or oscillations at the tool body.

This invention is based on the aim of providing a compact friction stir welding tool for universal application and also a method and an assembly for the real-time control of a friction stir welding process that succeed in optimizing the joining process in a simple and low-cost manner, so that it produces a joining weld that conforms to quality requirements without the need for subsequent finishing and minimizes the stress exerted on the friction stir welding installation.

This object is achieved by a friction stir welding tool consisting of a main tool body and a tool stirring stem comprising a shoulder and a pin, which according to claim 1 is characterized in that at least one sensor for recording the forces of acceleration acting on the main tool body is integrated in the main tool body.

DE 10 2012 010 836 B3, which originates from the applicant, discloses a method and a device for improving the quality of the weld seam in friction stir welding that is based on the aim of increasing the service life of the friction stirring tool from about 2 hours to 15 hours and increasing the quality of the joining seam in such a way that no finishing at all is required. This is achieved with a device having the following features:

a) a receiving plate (1) with a drive head (2) and a spindle bearing (4) for receiving a friction welding tip (9), wherein a transporting screw (6) which is machined in a spiral form in the spindle bearing (4) and serves for transporting away applied material that is not required enters into openings (8) leading obliquely outward, b) the longitudinal axis of the spindle bearing (4) is inclined with respect to the vertical at an angle of 2.8 to 3.2 degrees, c) the sliding surface of the rotary spindle consists of a planar sliding surface (10) and, particularly for the welding of curved seams, of a respective sliding surface (11) which is itself curved, adjoins on two opposite sides and is inclined at an acute angle to the sliding surface (11), d) the friction welding tip (9) has the form of a truncated cone on which the top surface is raised in the middle, and wherein the lateral surface of the truncated cone is formed by six trapezoidal segments, of which three segments are respectively distributed uniformly on the circumference, lie at an angle of 120 degrees with respect to one other and account for a proportion greater than ⅙ of the circular circumference.

Until now, no suitable measures have been known in friction stir welding for the welding of particular configurations of the parts to be joined that are respectively used, such as for example different thicknesses of the parts to be joined, even in the case of non-linear connections, or the welding of parts to be joined that are arranged at an angle, known as fillet welds.

The present invention is based on the object of providing a method and a device that allow the welding of materials of different thicknesses and the creation of fillet welds in friction stir welding.

This object is achieved by the device as claimed in claim 1, a device for friction stir welding materials of different thicknesses and having fillet welds with the following features:

a) a receiving plate (1) with a drive head (2) and a welding shoe (4) with a pin bearing, wherein the welding shoe (4) is selected and inserted according to whether it is being used for materials of different thicknesses or for materials with fillet welds, b) the longitudinal axis of the spindle bearing is inclined with respect to the vertical at an angle of 0 to 5 degrees; in the case of the fillet weld shoe (4) this transverse inclination is 0 degrees, c) when the welding pin (6) is changed, the length of the welding pin (6) is adjusted by means of an adjusting element (12) and the position of the Furthermore, as a particular configuration, it is provided that the counter-bearing of the welding pin (6) is adjusted by means of an adjustable pin stop stop (19) and, in the case of the pin stop (19), is additionally secured by an adjusting screw (20). It may also be provided that the length adjustment of the welding pin (6) is performed by means of a piezo element (16).

As a further configuration, it may be provided that the pressing pressure of the sliding surfaces (7) is adjustable, and the respective adjustment is measured, indicated and recorded and that the pressing pressure of the sliding surfaces (7) also automatically controlled during the welding process and consequently irregularities in the region of the parts to be joined are evened out. It may also be provided that means of which the pressing pressure is adjustable and for which the pressing pressure is monitored are used for fixing the components to be welded, the result of the welding process being optically monitored and recorded.

As the method as claimed in claim 5 for friction stir welding materials of different thicknesses and having fillet welds, it is claimed
  a) the operation of friction stir welding is performed with the same installation both in the case of welded connections with different materials and in the case of welded connections with fillet welds, in that a corresponding welding shoe is placed onto a holding cone (3),
  b) the longitudinal axis of the spindle bearing is inclined with respect to the vertical at an angle of 0 to 5 degrees; in the case of the fillet weld shoe (4) this transverse inclination is 0 degrees,
  c) when a welding pin (6) is changed, the length of the welding pin (6) is adjusted by means of an adjusting element (12) and the position of the counter-stop of the welding pin (6) is adjusted by means of an adjustable pin stop (19) and, in the case of the pin stop (19), additionally secured by an adjusting screw (20).

It is also claimed a method that the length adjustment of the welding pin (6) is performed by means of a piezo element (16).

It is also claimed that the pressing pressure of the sliding surfaces (7) is adjustable and the respective adjustment is measured, indicated and recorded and that the pressing pressure of the sliding surfaces (7) also automatically controlled during the welding process and consequently irregularities in the region of the parts to be joined are evened out.

Also claimed is a computer program with a program code for carrying out the method steps when the program is run in a computer. Claimed furthermore is a machine-readable carrier with the program code of a computer program for carrying out the method when the program is run in a computer.

The device according to the invention is described in more detail below. Specifically.

Figure 1:
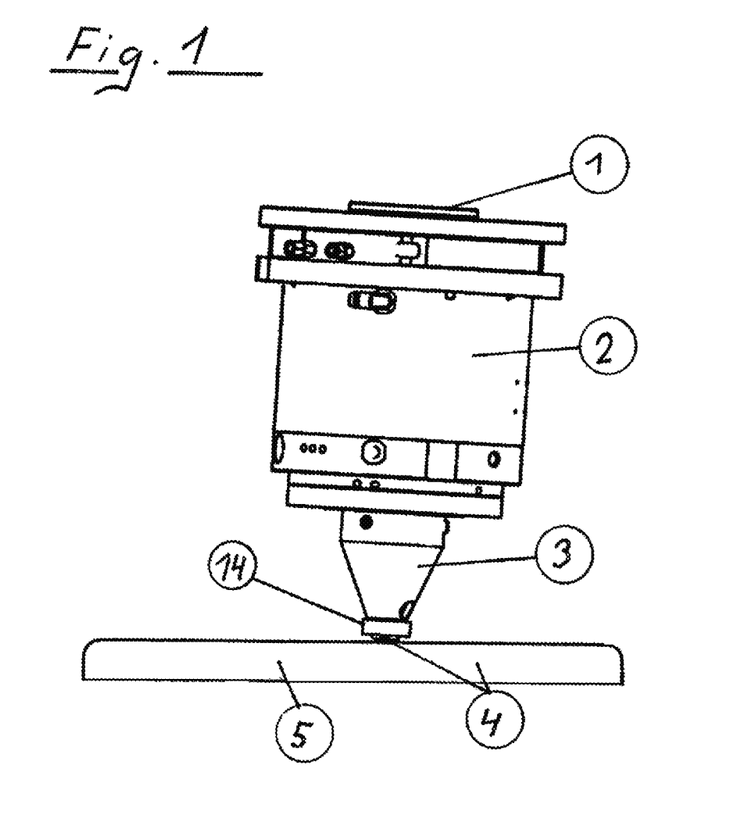
FIG. 1 shows a side view of an arrangement for friction stir welding

In FIG. 1, a side view of an arrangement for friction stir welding is shown. A receiving plate 1, which may be guided by a robot arm, carries a drive head 2 with a holding cone 3 for receiving a welding shoe 4 with a pin bearing for a welding pin, a welding shoe 4 being fastened on the holding cone 3 by means of a holding ring 14. The component to be joined is denoted in this representation by 5.

Figure 2:
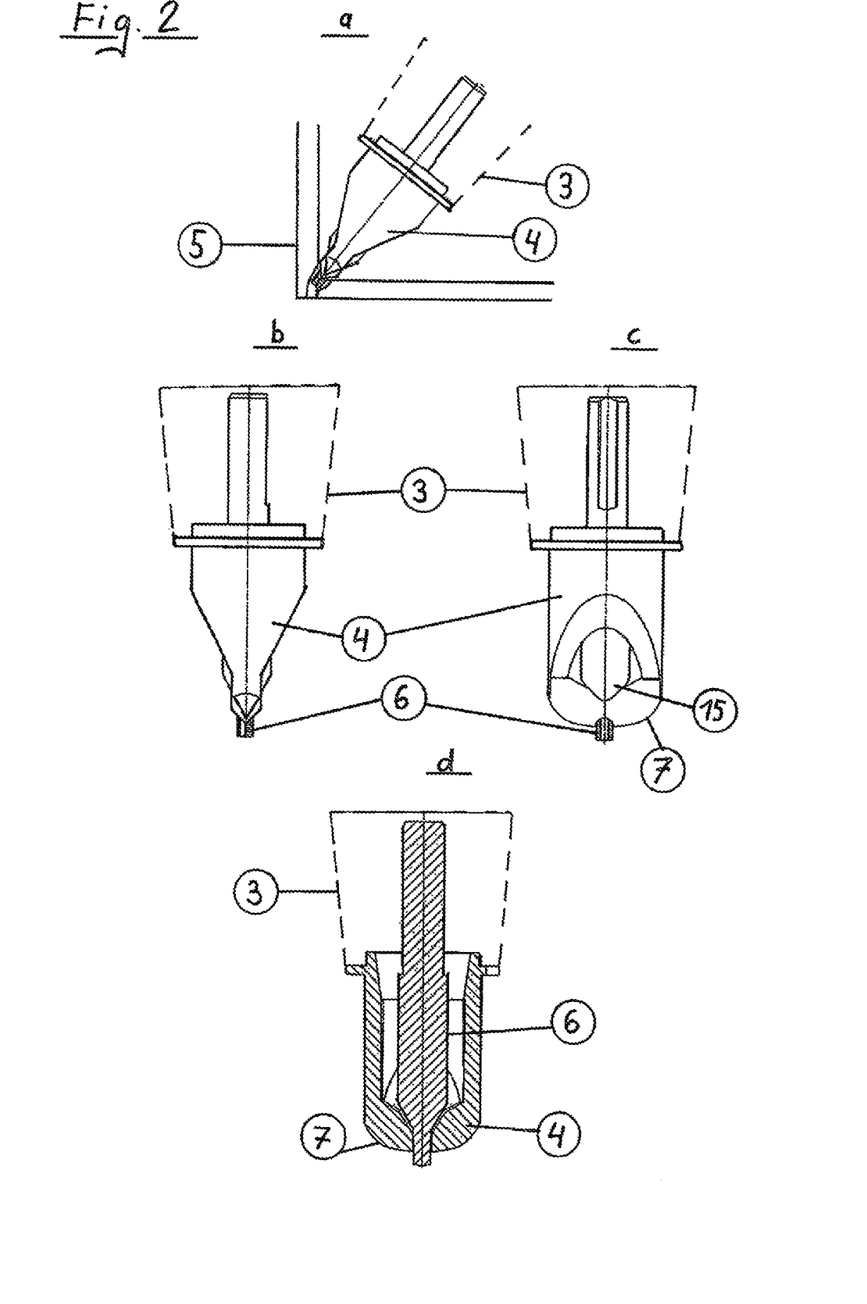
FIG. 2 shows representations for welding fillet welds

FIG. 2 shows representations for welding fillet welds.

In FIG. 2a, a front view of an arrangement of two metal sheets 5 to be welded is shown; the sheets are arranged at an angle in relation to one another and are connected by a fillet weld by means of a device for friction stir welding. A holding cone 3 and also a welding shoe 4 with a pin bearing are depicted here by dashed lines.

In FIG. 2b, the device from FIG. 2a is shown without the two metal sheets 5 in the view from the front. Apart from the welding shoe 4 and the holding cone 3, a welding pin 6 can be seen here. In the representation of FIG. 2c, the shoe sliding surface and the including shoe gliding surface 7 can be seen since the viewing side has been rotated by 90 degrees with respect to the representation shown alongside it. The region of emergence for the material that is not used during the friction stir welding operation is denoted by 15. These two partial figures show the rotation also in the representation in respect of the change of the view at the mounting of the holding cone 3.

Figure 6:
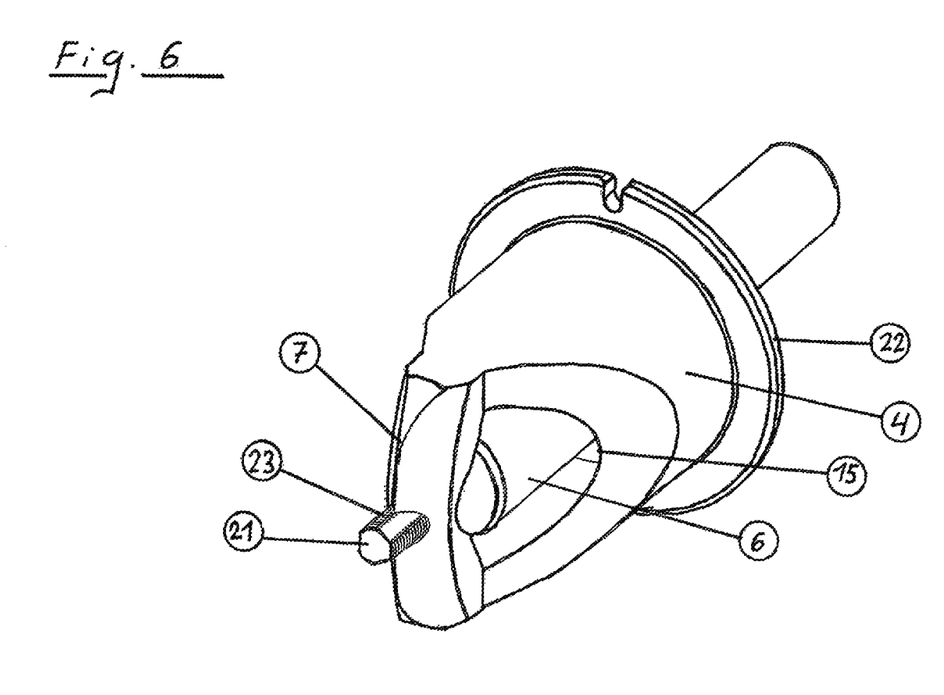
FIG. 6 shows a three-dimensional view of a welding shoe 4 for fillet welds

FIG. 2d shows in turn the representation of FIG. 2c in section with the previously described reference numerals. A three-dimensional representation is shown by FIG. 6.

Figure 3:
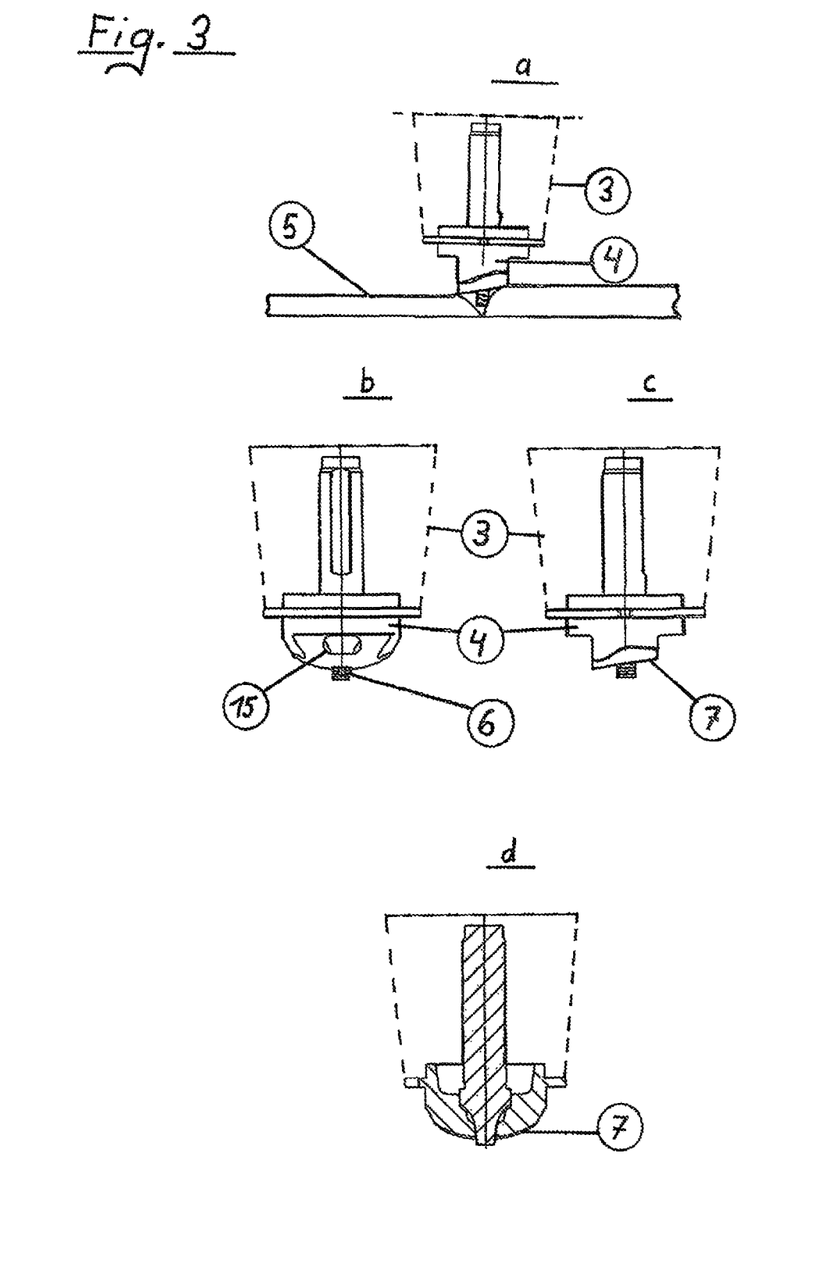
FIG. 3 shows representations for welding different material thicknesses

FIG. 3 shows representations for welding different material thicknesses. In a way corresponding to the relative dimensions in the representation of the welding of fillet welds, in FIG. 3a the welding operation for materials of different material thicknesses is shown in side view. Here, too, the holding cone 3, the corresponding welding shoe 4 and the component 5 to be joined, and also the welding pin 6 and the region of emergence 15 for the superfluous welding material are denoted. Also in this representation it is evident from FIG. 3b and the 90-degree-rotated FIG. 3c what form the welding shoe 4 used here takes in the various viewing planes. An idea of the actual form of a welding shoe is obtained from the seamless transitions from one viewing plane to the other. A person skilled in the art can in this way replicate the entire surface 7 of a welding shoe.

Figure 7:
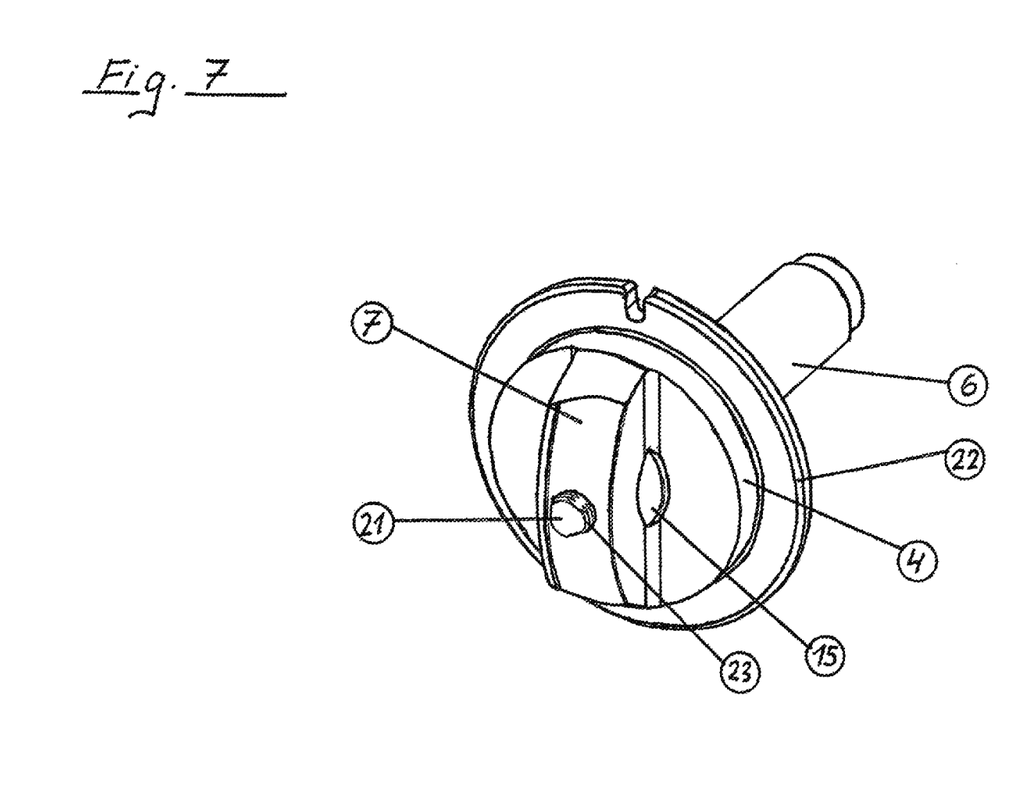
FIG. 7 shows a three-dimensional view of a welding shoe 4 for materials of different thicknesses.

A three-dimensional representation is also shown by FIG. 7.

Figure 4:
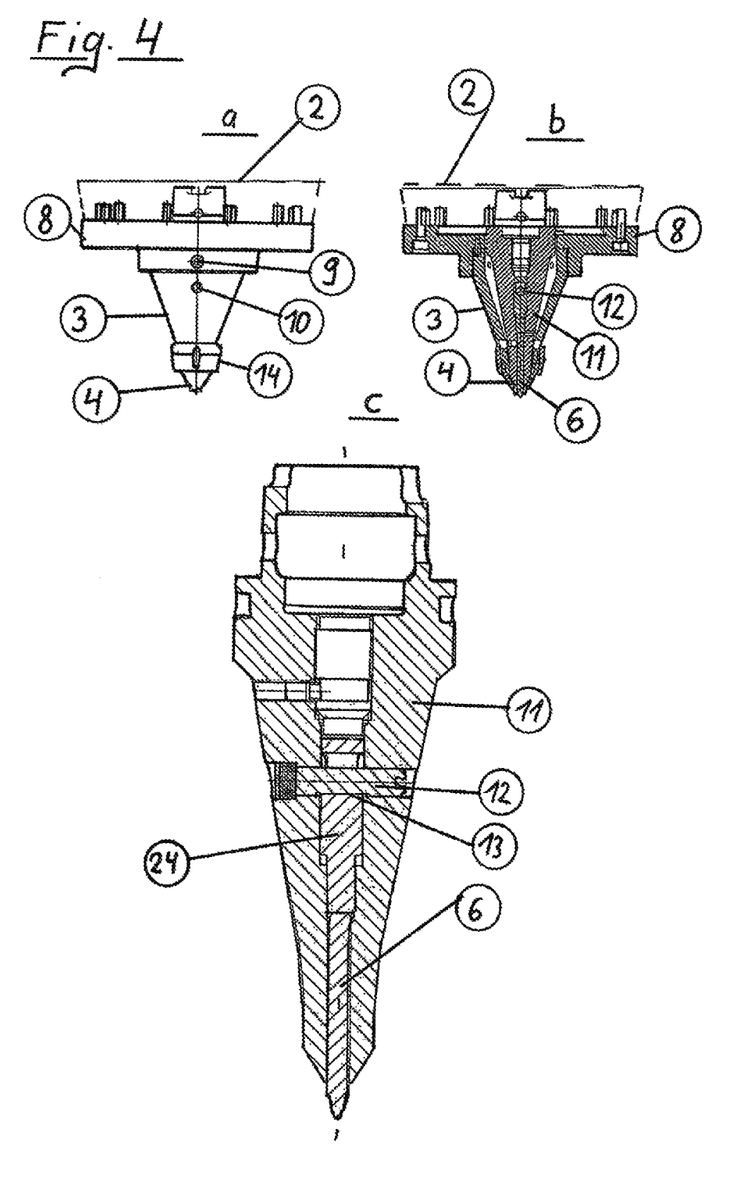
FIG. 4 shows representations for mounting a welding pin

FIG. 4 shows representations for the mounting of a welding pin. In FIG. 4a, the drive head 2 can be seen here, with its receiving flange 8 for the holding cone 3 and with its welding shoe mounting 14 for the welding shoe 4. In this view, a holding screw 9 for the holding cone 3 from FIG. 4c and an access bore 10 for an adjusting element 12 are also evident. This adjusting element may for example be a screw.

FIG. 4b shows the same representation as FIG. 4a in a sectional drawing.

In addition, the welding pin 6, the adjusting element 12 and the pin receiving cone 11 in cross section with respect to its arrangement in the holding cone 3 can be seen in this representation.

In FIG. 4c, the pin receiving cone 11 is once again depicted, on its own in a large form. The mounting of the welding pin 6 in the longitudinal axis of the pin receiving cone 11 is particularly shown here. Serving here for the length adjustment of the welding pin 6 is a pin adjusting element 24, arranged ahead of the welding pin 6. This pin adjusting element has an eccentric surface 13, which by means of a rotation of the adjusting element 12 in the pin receiving cone 11 allows the welding pin 6 to be linearly displaced. The eccentric surface 13 may also be a cam disk or a polygon structure. Here, displacements of the longitudinal axis of the welding pin 6 in the range of ¹⁄₁₀₀ millimeter are possible.

Figure 5:
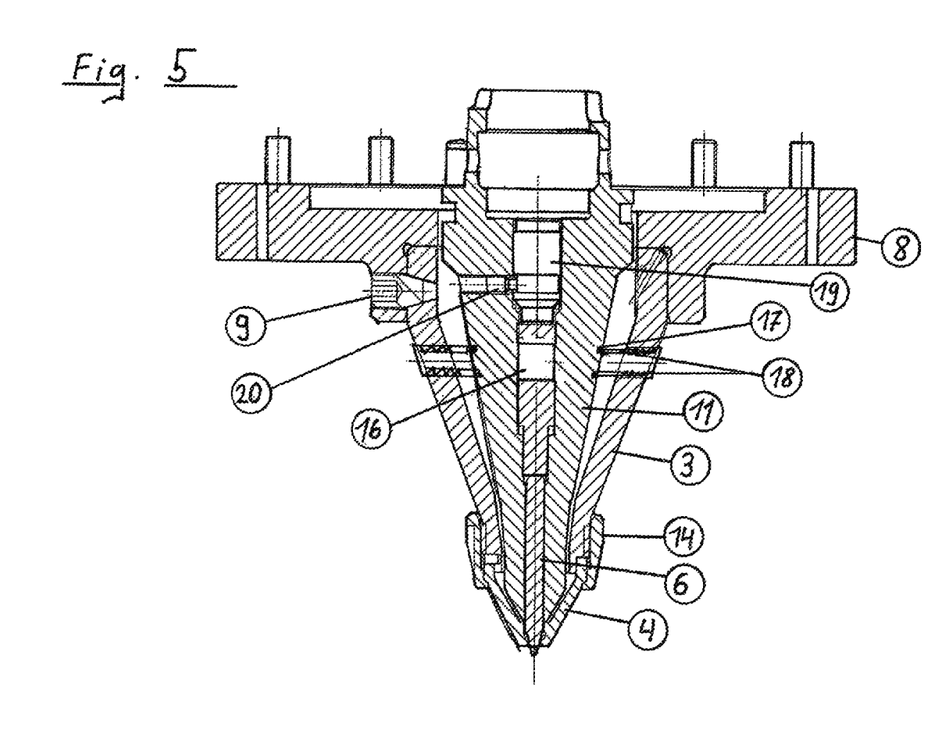
FIG. 5 shows a cross section through a quick adjustment of a welding pin

FIG. 5 shows a cross section through a quick adjustment of a welding pin. Here, the receiving flange 8 for the holding cone 3 and its connection to the pin receiving cone 11 are highlighted in detail. The welding shoe 4 and the pin bearing are held by the welding shoe holding ring 14. Instead of the adjusting element 12 here a piezo element 16 acts for the length adjustment of the welding pin 6. Serving for supplying power to the piezo element 16 are contact slip rings 17 and spring-loaded contact brushes 18. These also allow displacements of the longitudinal axis of the welding pin 6 in the range of ¹⁄₁₀₀ millimeter to be achieved. However, here the length adjustment of the welding pin 6 that has to take place in each case when inserting a new welding pin 2 can be performed automatically. Instead of a piezo element 16, hydraulic or electrohydraulic adjusting systems are also conceivable.

Serving as a counter position for the welding pin 6 is the pin stop 19 at the upper end of the pin receiving cone 11. By means of a fine thread on its outer side, this pin stop 19 can be adjusted in the pin receiving cone 11 with respect to its longitudinal axis by means of a corresponding tool in the accuracy range of ¹⁄₁₀ millimeter. The holding screw 20 serves for fixing the pin stop 19.

FIG. 6 shows a three-dimensional view of a welding shoe 4 for fillet welds. The reference numerals correspond to those already described. In addition, here the welding pin tip 21 with its external thread 23 is depicted. The turning direction of this external thread 23 is opposite to the turning direction of the welding pin 6. In this way it is ensured that material is moved toward the welding pin tip 23 during the welding operation and is maintained the welding operation. The receiving flange 22 serves for the fastening of the welding shoe 4.

FIG. 7 shows a three-dimensional view of a welding shoe 4 for materials of different thicknesses. For the reference numerals, the same as in the case of FIG. 6 applies correspondingly.

For monitoring the welding operations, the pressing pressure of the sliding surfaces 7 of the welding shoes 4 that are respectively used is adjustably designed, and the respective adjustments are measured, indicated and recorded.

However, the pressing pressure of the sliding surfaces is not only adjustable, but is also automatically controlled during the welding process. As a result, irregularities in the region of the parts to be joined that occur during the welding process are automatically evened out.

Equally, it is provided that means of which the pressing pressure is adjustable and for which the pressing pressure is monitored are used for fixing the components to be welded.

It is also provided that the result of the welding process is optically monitored and recorded.

The control of the complex movement processes and the signal processing of the sensors used require a special control program.

LIST OF DESIGNATIONS

1 Receiving plate (robot arm)
2 Drive head
3 Holding cone for welding shoe
4 Welding shoe and pin bearing
5 Component to be joined (welded article)
6 Welding pin
7 Shoe sliding surface and shoe gliding surface
8 Receiving flange for the holding cone 3
9 Holding screw with cone for the holding cone (3)
10 Access bore for the adjusting screw 12
11 Pin receiving cone
12 Adjusting element (adjusting screw)
13 Eccentric surface
14 Welding shoe holding ring
15 Region of emergence for material
16 Piezo element (pin length adjustment)
17 Contact slip ring
18 Contact brushes (spring-loaded)
19 Pin stop (counter-bearing)
20 Holding screw for the pin stop 19
21 Welding pin tip
22 Receiving flange for a welding shoe
23 Thread in the welding pin tip (running counter to the turning direction)
24 Pin adjusting element

The invention claimed is:

1. A device for friction stir welding materials of different thicknesses or materials to be joined by a fillet weld, the device comprising:
   a receiving plate with a drive head,
   a welding shoe with a pin bearing,
   wherein the welding shoe comprises a shoe sliding surface for materials of different thicknesses or a shoe gliding surface for materials to be joined by a fillet weld;
   wherein the pin bearing is at an angle of 0 to 5 degrees with respect to its longitudinal vertical axis,
   wherein the shoe gliding surface is inclined with respect to the pin bearing's transverse axis;
   a welding pin having a length that is adjustable by a pin adjusting element; and
   a pin counter-bearing having an adjustable position that is adjusted by an adjustable pin stop,
   wherein the pin stop is secured by an adjusting screw.

2. The device as claimed in claim 1, wherein the pin adjusting element comprises a piezo element, a hydraulic system, or an electrohydraulic system.

3. A method for friction stir welding materials of different thicknesses or materials requiring fillet welds comprising the steps:
   providing materials of different thickness or materials to be joined by fillet weld;
   providing a device for friction stir welding as claimed in claim 1;
   attaching the welding shoe comprising the shoe sliding surface for materials of different thicknesses, or the welding shoe comprising the shoe gliding surface for materials to be joined by fillet weld;
   contacting the device for friction stir welding with the materials of different thickness or the materials to be joined by fillet weld using; and
   applying a pressure to the device.

4. The method as claimed in claim 3, wherein the length of the welding pin is adjusted by the pin adjusting element comprising a piezo element, hydraulic system, or electrohydraulic system.

5. The method as claimed in claim 3, wherein the pressure applied to the shoe sliding surface or shoe gliding surface is adjusted and the respective adjustment is measured, indicated and recorded.

6. A computer program with a program code for carrying out the method steps as claimed in claim 3, when the program is run in a computer.

7. A machine-readable carrier with the program code of a computer program for carrying out the method as claimed in claim 3, when the program is run in a computer.

8. The device as claimed in claim 1, wherein the welding shoe comprises the shoe sliding surface for friction stir welding materials of different thicknesses.

9. The device as claimed in claim 1, wherein the welding shoe comprises the shoe gliding surface for materials to be joined by a fillet weld.

10. The device as claimed in claim 2, wherein the pin adjusting element comprises a piezo element.

11. The method as claimed in claim 4, wherein the pin adjusting element comprises a piezo element.

12. The method as claimed in claim 3, further comprising:
attaching the welding shoe to the device;
adjusting the length of the welding pin;
adjusting the pin stop;
adjusting the shoe sliding surface such that it is inclined at an angle of 0 to 5 degrees with respect to its longitudinal axis; or
adjusting the pressure.

13. The method as claimed in claim 3, further comprising:
adjusting the length of the welding pin; and
adjusting the pin stop.

14. The method as claimed in claim 3, comprising attaching the welding shoe comprising the shoe sliding surface for materials of different thicknesses.

15. The method as claimed in claim 3, comprising attaching the welding shoe comprising the shoe gliding surface for materials to be joined by a fillet weld.

16. The method as claimed in claim 3, comprising attaching the welding shoe comprising the shoe sliding surface for materials of different thicknesses and the welding shoe comprising the shoe gliding surface for materials to be joined by fillet weld in sequence.

* * * * *